March 22, 1955
J. J. STRNAD
2,704,549
NON-CHATTERING RELIEF VALVE
Filed Jan. 29, 1951
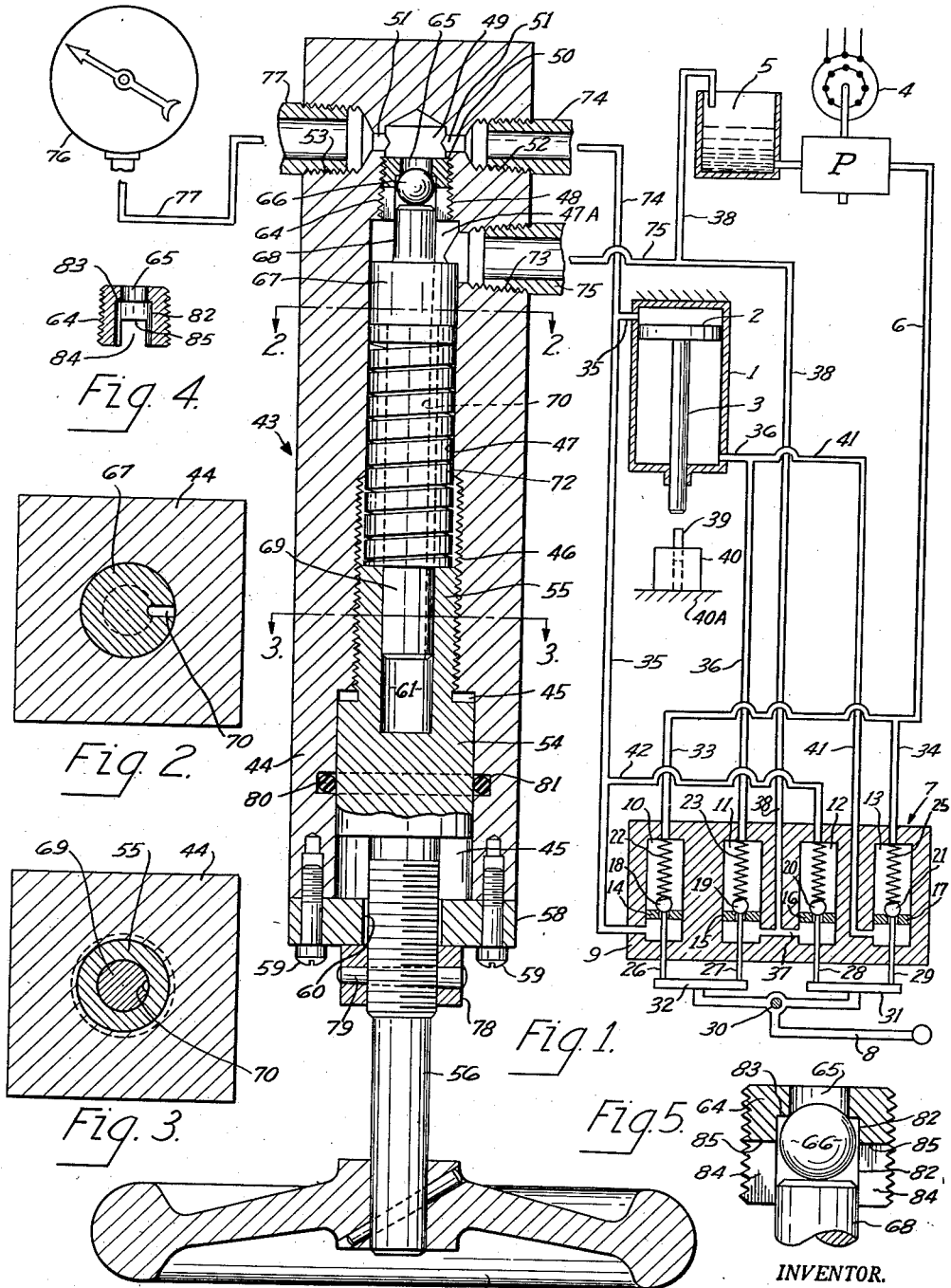
INVENTOR.
JAMES J. STRNAD
BY
Harry P. Canfield
ATTORNEY.

United States Patent Office 2,704,549
Patented Mar. 22, 1955

2,704,549

NON-CHATTERING RELIEF VALVE

James J. Strnad, Bedford, Ohio, assignor to Lempco Products, Inc., Bedford, Ohio, a corporation of Ohio Application January 29, 1951, Serial No. 208,315

4 Claims. (Cl. 137—469)

This invention relates to hydraulic-pressure valve-controls; and particularly to such valve controls that limit to an adjustable preselected maximum, the hydraulic pressure that can be applied at a point of use.

While the invention is applicable to uses in various arts, one of its most important uses is to control to a preselected maximum, the working pressure that can be developed in a hydraulic press; and for the purposes of a full description herein of at least one use, as required by law, it will be described as applied to that use.

The invention is embodied in a valve structure comprising a valve seat or port normally held closed by spring pressure. Hydraulic working pressure, supplied to the press from a pressure source (for example a motor driven pump) capable of delivering working pressure at the press in excess of that wanted is communicated to the valve structure in such manner that it tends to open the valve in opposition to the spring pressure.

The hydraulic pressure at the press rises as it performs its work and when it attains the value wanted, any further rise of pressure moves the valve to open the valve port, and the hydraulic liquid discharges from the press through the port back to the source.

The working pressure at the press is thus balanced against the spring pressure at the valve and cannot rise higher at the press than permitted by the spring pressure.

The rising pressure at the press and communicated from the press to the valve structure is indicated as a rising pressure on a gage, and the indicated pressure stops rising when the valve discharges.

The spring pressure is manually adjustable. By adjusting the spring pressure and concurrently reading the gage, the pressure at which the valve discharges as indicated by the gage, can be raised or lowered, and thus the maximum pressure attainable at the press can be preselected by the adjustment.

Problems are encountered in devising a valve structure having the aforesaid mode of operation. Among these may be mentioned, the following.

In a valve construction comprising simply a valve held on a valve seat by a spring to close a port in the seat, and the valve being subjected to hydraulic pressure in a chamber on the other side of the port, when the valve is pushed off the seat by the hydraulic pressure in the chamber opposing the spring, the resulting discharge of pressure from the chamber through the port, tends to reduce or collapse the pressure in the chamber, and it becomes insufficient to hold the valve off the seat. The valve then tends to be immediately returned by the spring to close the port again; whereupon the collapsed pressure tends to be restored to full value and again opens the port. This opening and closing occurs rapidly, the valve having a vibratory movement, chattering on the valve port or seat. Undesirable noise, excessive wear, pressure surges in the hydraulic system, etc., are thus inherent in such a valve and the problem of obviating them is presented.

Again it is desirable, as mentioned above, to adjust the value of hydraulic pressure in the chamber at which the valve opens the port, by adjusting the spring tension. In a simple valve construction, as referred to above, the range of such adjustment is small. If the spring be adjusted to exert small force, so that a small hydraulic pressure in the chamber moves the valve to open the port, then there is small tendency for the pressure in the chamber to collapse and allow the valve to close the port, as aforesaid, and the valve tends to respond to stay open and exhaust the pressure through the port. But if the spring be adjusted to exert great force, and the pressure to move the valve open is correspondingly high, then any movement of the valve in the opening direction exhausting pressure through the port, tends to cause a great collapse of the opening pressure in the chamber, and a great tendency for the valve to be returned to close the port; so that the effectiveness of the pressure to open the port and hold it open to exhaust, becomes less and less at higher and higher pressures; and accordingly, the range of adjustable exhausting pressures is curtailed.

These problems have been solved in the present invention by a novel means to damp out the vibratory tendency of the valve, and by a novel construction of valve and valve seat.

Again, the high values of pressure employed in hydraulic press systems, call for a long and very strong spring to hold the discharge valve closed; and the problem is presented of directing the force of the spring to act on the valve axially of the valve port substantially without side thrust. This problem is solved by the invention by a novel plunger construction movable by the spring and engaging the valve.

Another problem is to arrange the parts so that they can be housed in steel to take advantage of the strength of steel for the high pressure valve chamber; and to reduce the cost of production and assembly of parts of the valve structure to the minimum. This is solved by means of a novel housing made from a block or bar of steel by simple drilling, boring, reaming, threading operations on the interior of the block, all performed from one end of the block.

Another problem is to prevent accidental adjustment of the valve to an excessively high maximum pressure that might damage the press. This is solved by novel stops for the movable adjusting parts.

It is the object of the invention to provide an improved valve structure having the above described characteristics and mode of operation, and in which the aforesaid and other problems are solved.

Other objects will be apparent to those skilled in the art to which the invention appertains.

The invention is fully disclosed in the following description taken in connection with the accompanying drawing in which:

Fig. 1 is a view showing in longitudinal section, a control valve device embodying part of the invention and showing diagrammatically a hydraulic press with which the control valve is associated.

Figs. 2 and 3 are cross sectional views taken from the planes 2—2 and 3—3 respectively of Fig. 1.

Fig. 4 is a longitudinal sectional view of a valve seat of Fig. 1, taken on a plane at right angles to the sectional plane of Fig. 1.

Fig. 5 is a view of a valve and valve seat of Fig. 1 to an enlarged scale.

Referring to the drawing, there is shown diagrammatically at 1, the cylinder, and at 2 the piston of a hydraulic press, the piston rod 3 constituting a ram for doing work when forced downwardly by pressure in the cylinder.

At P is a liquid pump driven by a motor 4, taking in liquid, such as oil from a reservoir 5, and pumping it into a supply pipe 6, leading to an operable valve system 7, which is operable by an operator's lever 8, to discharge oil from the lower end of the cylinder 1, and to direct oil from the pipe 6 under pressure into the upper end of the cylinder 1 to push the ram downwardly; and alternatively to direct oil to the lower end and exhaust it from the upper end to retract the ram.

The valve system 7 may be variously constructed for these purposes, its exact structure not constituting an essential part of the present invention. That shown comprises a block housing 9 having four chambers 10 to 13 therein; transverse valve seats in the chambers with ports 14 to 17 therein; ball valves 18 to 21 on the ports; springs 22 to 25, normally holding the ball valves yieldably on the ports to close them; and stems 26 to 29 extending downwardly out of the housing 9 for raising and lowering the balls to open the ports and allow them to close the ports.

The lever 8 is pivoted at 30 and has heads 31—32 on opposite sides of the pivot; and when the lever is depressed it raises the head 32 to engage the ends of the stems 26 and 27 and raises the balls 18 and 19, and when the lever is raised, the head 31 similarly engages stems 28 and 29 and raises the balls 20 and 21.

Various pipe connections in the drawing will be referred to in the description of operation which follows.

Oil pressure in the pipe 6 is communicated by pipes 33—34 to the chambers 10 and 13, and is normally blocked off by the ball valves 18—21.

Upon rocking the lever 8 downwardly, balls 18 and 19 are raised. Oil under pressure then flows from the pipe 33, into chamber 10 through port 14, by pipe 35 to the cylinder 1 above the piston 2 to push it down; and oil under the piston is forced out through pipe 36 into chamber 11 through port 15 and by pipes 37—38 up to the reservoir 5 into which it discharges.

When the lever is restored to normal, the balls 18 and 19 close the ports 14 and 15 and cut off pressure from the cylinder 1 and further movement of the piston 2 is stopped.

The ram 3 may be used to do any suitable kind of work, for example, to press a pin 39 into a bore in a block 40, supported on a bolster 40A of the press.

The force required to move the ram may be a small force or a great force, according to the operation, and may increase as the job proceeds. The force and the speed of the ram may be regulated and controlled by the amount of depression of the lever 8 which allows oil to be supplied at a greater or lesser rate to the cylinder, by accordingly throttling the flow at the valve port 14, as will be understood.

The descent of the ram may be likewise stopped by restoring the lever to normal position.

In any case, the motor driven pump P, is capable of supplying pressure in the cylinder 1 in excess of the maximum necessary for any job the press may be called upon to perform.

When the lever 8 is rocked upwardly, balls 18—19 keep their ports 14—15 closed and balls 20—21 are raised to open their ports 16—17 by the stems 28—29.

Oil under pressure then flows from pipes 6 and 34 to the chamber 13, through the open port 17, by pipes 41 and 36, to the under side of the piston 2, and oil above the piston is forced out through pipe 35 and by pipe 42 to chamber 12 and through open port 16 to pipes 37 and 38 and discharged into the reservoir 5; and the piston 2 and ram 3 are thereby retracted.

The aforesaid valve structure for indicating the working pressure and force on the ram and for limiting it to a preselected maximum, and for adjustably preselecting that maximum, is shown generally at 43.

It comprises an elongated housing 44 made from a metal block or piece of metal bar, preferably of square cross-section, and preferably steel, although any readily workable alloy may be used.

It is worked out internally along its central axis to provide an internal chamber of varying diameter, and, to facilitate the work, the diameters of the several portions are successively smaller proceeding upwardly or inwardly; the operations of making the chamber may all be performed from one end, any may all be simple drilling, reaming and threading operations.

At the lower end is a lower cylinder portion 45. Next above this is an internally threaded portion 46 of smaller diameter. This is followed by an upper cylinder portion 47 of still smaller diameter, at the upper end of which is a threaded portion 48 of still smaller diameter, beyond which is a cylindrical recess or valve chamber 49 of still smaller diameter, providing an annular shoulder 50.

A transverse duct 51 is drilled through the block, opening into the valve chamber 49. At its outer ends it is enlarged into pipe threaded openings as at 52 and 53.

Internal parts are assembled in the housing as follows:

At the lower end of the housing, a cylindrical body 54 rotatably fits in the cylindrical portion 45, and on its upper side has a threaded extension 55, screwed into the threads 46; and at its lower end has a stem 56 extending downwardly out of the housing and provided on its lower end with a handle 57 for rotating the body 54, and threaded extension 55, to screwingly propel them upwardly or downwardly, the cylindrical portion 45 being longer axially than the body 54 for this purpose.

To stop downward movement of the body 54, a plate 58, is mounted on the lower end of the housing by screws 59—59, and a hole 60 is provided therein for the stem 56.

The upper end of the threaded extension 55 has an upwardly open bore 61 therein.

At the upper end of the housing, a threaded bushing 64, is screwed into the threaded portion 48 and bottomed on the shoulder 50. The bushing opening therethrough provides a valve port 65. The port is enlarged on its lower side and the bushing thus provides a valve seat for a valve ball 66 to open and close the port.

A plunger is provided comprising a cylindrical plunger body or guide portion 67 slidingly fitting the upper chamber portion 47, a valve stem 68 of smaller diameter than the body 67 on its upper end abutting upon the under side of the ball valve 66, and a plunger stem 69, of smaller diameter than the body 67 on its lower side extending downwardly into and slidingly fitting in the extension bore 61.

The plunger has a groove 70, Figs. 1 and 2, in the side of the stem 69, the full length thereof and in the side of the body 67, opening at its lower end into the bore 61, and at its upper end into the cylindrical chamber portion 47, above the body 67.

A helical compression spring 72 surrounds the plunger stem 69 and diametrically substantially fills the cylindrical portion 47 and is squared off on its ends, abutting at its upper end upon the under side of the plunger body 67 and at its lower end upon the upper end of the extension 55.

A pipe threaded hole 73 extends laterally from the cylindrical chamber portion 47 above the body 67 to the outside of the housing 44.

The aforesaid pipe 35 connects with a pipe 74, screwed into the pipe threaded hole 52; and the aforesaid pipe 38 connects with a pipe 75, screwed into the pipe threaded hole 73.

At 76 is a pressure indicating gage. It is connected to a pipe 77 screwed into the threaded hole 53.

In operation of the valve device 43, in connection with the press, the valve stem 68 holds the ball valve 66 upwardly yieldably on the valve seat 64 closing the port 65, by the pressure of the spring 72 which is adjustable by screwing the extension 55 in or out by the handle 57.

The line of action of the spring is at all times guided or directed to be axially of the port 65, by being first transmitted to the plunger 67—68—69, which in turn, is guided by the body 67 slidingly fitting the chamber portion 47 and by the plunger stem 69, remote axially from the body 67, and slidingly fitting in the extension bore 61.

Hydraulic working pressure in the press cylinder 1 is communicated to the valve chamber 49 and to the upper side of the valve 66 by the pipe 74, and this pressure is communicated from the valve chamber 49 to the gage 76 by the pipe 77 and is indicated on the gage.

The working pressure in the press cylinder 1 rises as the press performs its job, as referred to, and the pressure in the valve chamber 49 rises accordingly, and exerts downward force on the ball valve 66 tending to move it and open the port 65; and when the pressure rises until the downward force on the ball valve becomes greater than the upward spring force thereon, the spring yields and the valve 66 opens the port 65 and the oil under pressure discharges from the valve chamber 49, through the port 65 into the cylindrical portion 47, above the plunger body 67, and out by the pipe 75, and thence by pipe 38 to the reservoir 5.

The working pressure in the press cylinder 1 therefore cannot rise higher than the pressure for which the spring 72 is set and after this maximum pressure is attained, it is therefore maintained throughout the remainder of the press operation; and this pressure is indicated on the gage 76.

If a greater maximum working pressure is wanted, the handle 57 is turned to further compress the spring 72 and the pressure observed on the gage until the desired maximum is reached.

For any particular press job to be performed, the maximum attainable pressure can be preselected and the valve preset to limit the pressure to that maximum.

One way to do this is to put a block on the bolster 40A under the press ram 3, and reduce the spring pressure by the handle 57 to a low value; then admit pressure to the cylinder 1 under control of the lever 8 to drive the ram down against the block and exhaust the pressure back to the reservoir 5, at the valve 66. The cylinder pressure is at all times indicated on the gage 76. The handle 57 is then turned to increase the spring pressure, and the cylinder pressure necessary to effect exhaust at the valve 66, rises accordingly, and its rise is indicated on the gage 76. When the desired exhaust pressure is indicated on the gage, turning of the handle 57 is discontinued. The valve is thereby set to open at the maximum predetermined pressure thus selected.

Provision is made to prevent setting the valve to an excessive maximum pressure which might damage the press. The stem 56, where it passes through the hole 60 in the plate 58 is threaded, and has a stop nut 78 on the threads below the plate 58. The stem 56 is rotated to compress the spring 72 until, by test, the highest permissible discharge pressure at the valve 66 is indicated on the gage. The stop nut 78 is then screwed up along the stem until it is stopped on the plate 58, and is permanently fixed in that position by drilling a hole through the stop nut 78 and through the stem 56, and driving a pin 79 in the hole.

Thereafter upon adjusting for a maximum pressure by turning the handle 57 and screwing in the extension 55, the adjustment is stopped at a safe maximum by engagement of the stop nut with the under side of the plate.

Particular features of the invention as referred to hereinbefore will now be described.

When downward force on the ball valve 66 due to pressure in the valve chamber 49, exceeds the upward force on the ball due to the spring 72, the ball moves down and opens the port 65 and discharges the liquid under pressure from the valve chamber 49 as described. In the absence of any means to counteract it, the pressure in the valve chamber would be reduced thereby or collapse and the downward force on the ball would be reduced and the spring would return the ball upwardly and close the port. This would cause the pressure in the valve chamber to again be restored, and to move the valve down again.

The ball 66 and the plunger 68—67—69 would thus reciprocate, and due to mass inertia would overtravel and cause the ball valve 66 to rapidly open and close the port with a vibratory chattering on the valve seat causing noise, often a high frequency tone, and excessively wearing the valve seat; all of which are highly objectionable.

This is prevented as follows:

In the construction hereof, the plunger stem 69 fits the extension bore 61 like a piston in a cylinder. The bore 61 and the groove 70 connecting it to the chamber portion 47, or that portion of it at 47A above the head 67, are at all times filled with oil. When the plunger tends to reciprocate, as referred to, downward movement of the stem 69 will force oil out of the bore 61 and upwardly through the groove 70; and upward movement will draw oil downwardly through the groove into the bore. The stem 69 and the bore 61 thus constitute, in effect, a pump, tending to force oil upwardly and draw it downwardly through the groove 70. The groove is of restricted cross section and the reciprocations of the plunger are retarded and its tendency to vibrate is damped out.

Also, the groove 70 connecting the bore 61 with the chamber portion 47A tends to prevent excessive difference of pressure in the bore 61 and chamber 47A which might interfere with the plunger movement.

The plunger therefore moves downwardly or upwardly only far enough to take up a position at which the force of the pressure in the valve chamber 49, and the force of the spring are balanced; and vibratory reciprocation and chatter is prevented.

Furthermore, the construction of the valve and valve seat, besides making possible a wide range of adjustment of the valve opening pressure to be described later, also contribute to the above described non-chattering action of the valve.

The valve port 65 in the upper end of the bushing 64 as viewed in Figs. 1, 4 and 5 opens into a cylindrical-walled chamber or valve cylinder 82 of larger diameter than the port 65 thereby providing a shoulder 83 which is the valve seat proper. The valve cylinder 82 continues to the lower end of the bushing, and the valve stem 68 projects upwardly into it, with a sliding fit, and supports the ball valve 66 on its upper end.

In the lower part of the bushing 64 are two diametrically opposite outlets 84—84, preferably provided by cutting slots in the end of the bushing, and the tops 85—85 of the slots are preferably planar and in a common horizontal plane.

The diameter of the valve cylinder 82 is slightly greater than the diameter of the ball valve 66. As an illustrative case, the valve may be a 5/16" ball-bearing ball, and the valve cylinder may be drilled with a 21/64" bottom drill. Corresponding with these illustrative dimensions, the slots 84—84 may be 1/4" wide; and the slots are cut to such depth that when the ball valve 66 is held on the valve seat 83, the center of the ball is approximately in the said plane of the tops 85—85 of the slots, or, if any difference, slightly below that plane when first made to allow for some subsequent wear on the valve seat.

It follows from this construction, that when the ball valve 66 first begins to move away from the valve seat 83 to open the port 65, the port opening is of annular form; and the area of this annular opening tends to increase rapidly with downward movement of the ball, approaching the full area of the port 65.

The hydraulic liquid flowing through this annular port opening is constrained to flow around the ball through the small clearance between the ball and the wall of the valve cylinder 82, and then out through the slots 84—84. The ball valve 66 thus at first throttles the flow through the port, at the ball and valve cylinder clearance.

As the ball 66 leaves the valve seat 83, and the annular port area increases, the port area quickly tends to become greater than the outlet area around the ball and the entire upper half of the ball is subjected to pressure and it is moved farther downward and begins to uncover the tops 85—85 of the outlet slots 84—84, giving an outlet of increasing area around the ball and under the tops of the slots; and the ball then throttles the flow at the tops of the slots.

If the ball be considered as momentarily moving downwardly against the spring force so far that the area of outlet around it and under the tops of the slots becomes greater than the port opening area, then the pressure of the liquid in the valve cylinder 82 above the ball would have such free exhaust that it would decrease the pressure on the upper half of the ball, and the spring pressure would return the ball upwardly until the liquid pressure on top of the ball and the spring force on its under side were balanced; and at this position of the ball it restores its throttling action.

Thus the throttling action is always present when the valve port is open; and the throttling area around the ball and into the slots is always less than the port-opening area.

The ball thus automatically takes up a throttling position, at which it is off the valve seat; maintaining pressure in the valve cylinder 82 above the ball and preventing the aforesaid collapse of pressure upon opening of the port; and preventing said chatter since all movements of the valve, even if they should momentarily for any reason become vibratory, occur when it is out of contact with the valve seat.

As aforesaid, the valve construction makes possible a wide range of adjustment of the valve opening pressure in the pressure chamber 49 impossible with a simple ordinary spring-pressed valve.

In a simple valve construction comprising a port and a valve held on the port by the force of a spring to keep it closed against hydraulic pressure tending to open it, when the pressure overpowers the spring and the valve moves to open the port, the full area of the valve is subjected to the pressure and it tends to open wide. This causes a collapse of the pressure or a great reduction thereof on the valve in the port opening direction and the spring tends to move the valve to close the port again, or partly close it.

If the spring force on the valve is adjusted to a given value corresponding to a desired port opening pressure, the parts can be designed to correspond to that pressure so that when the valve is moved thereby to open the port, the collapse or reduction of the opening pressure will be small, and the tendency for the valve to close will be small, and the valve will open and stay substantially open as wanted.

But when, with the same parts, the spring force is increased by adjustment, corresponding to a higher desired port-opening pressure, then when the valve opens the port, the collapse or decrease of the opening pressure is greater, and the tendency for the valve to again close the port is greater, and the port opening is less.

Thus, as the spring force is increased more and more, the possible valve opening becomes less and less, and a spring force is soon reached at which the port opening is too small to give the pressure relief wanted.

Thus the simple ordinary spring pressed relief valve construction can be adjusted for pressure relief over only a small range of pressures.

Where a wide range of relief pressure adjustment is wanted it has heretofore been necessary to provide several valve constructions, each designed to respond and give pressure relief over a small part of the total range.

In the valve construction hereof, when the ball valve 66 is moved from its valve seat 83 by pressure in the valve chamber 49 to open the port 65 for pressure relief, there is no collapse or great reduction of pressure in the valve chamber 49 above the valve, because the flow through the port 65 is throttled by the ball valve 66 itself, as described, and the pressure is maintained in the valve chamber 49.

Thus, whether the spring is adjusted to be very strong or very weak, the valve 66 stays in open position so long as the actuating excess pressure obtains in the chamber 49, and accordingly, the spring can be adjusted for pressures over a wide range.

As further explanation of this valve action, it will be noted that the duct 51 leading into the valve pressure chamber 49 is small; and upon opening of the valve port 65, the liquid flow out of the chamber and through the port is retarded by the small duct 51, and tends to produce reduced pressure in the chamber 49 as referred to. However, the flow is also retarded by the aforesaid throttling action by the ball valve 66 itself, so that the reduction of pressure in the valve chamber 49 is negligible.

If the flow should tend to be at great velocity, tending to produce drop of pressure in the chamber 49, the pressure on the upper half of the ball 66 would be reduced and the spring 72 would return the ball upwardly and increase the throttling action at the tops 85—85 of the slots 84—84 until the pressure in the chamber and on the ball is again restored.

There is the tendency therefore for the rate of flow to be constant at all liquid pressures resulting from all adjustments of the spring 72, which results in keeping the valve 66 off the valve seat, avoiding chatter and permitting adjustment over a wide range as aforesaid.

The throttling by the ball valve 66 does not interfere materially with free exhaust from the valve chamber 49 and the relief of excess pressure. If the port 65 were very small, then when the ball valve 66 opens it and becomes subjected to the opening pressure on its upper half, it will tend to move farther down in the valve cylinder 82 and throttle less, and vice versa.

Fig. 1 of the application drawing has been made to scale from an actual valve construction produced by the applicants' assignee, for use with a hydraulic press capable of delivering a working force of 150 tons; and by adjustment of the spring 72, the valve construction can be set to open and relieve the pressure in range for the press from the said 150 tons down to 5 tons.

A suitable size of port for the illustrative example given above is one of ¼" diameter, and a suitable size for the duct 51 is ⅛".

Other features of the construction may be noted as follows:

Oil is prevented from leaking downwardly around the body 54 into the chamber portion 45 under the body by a sealing ring 80 of the "O-ring" type, of rubber or like yieldable deformable material disposed in a groove 81 in the wall of the chamber portion 45 and constrictingly encircling the body 54.

The gage 76 may be calibrated to indicate the pressure in the press cylinder 1, in pounds per square inch, or for greater convenience may be calibrated to indicate the load force exerted by the ram 3 in pounds or tons as will be understood.

In this condition, it will be understood that a spring 72 will be chosen corresponding to the range of load of the press and capable of being adjusted to limit the ram force of the press to any force that may be preselected in that range.

The construction of the valve device admits of readily changing the spring to adapt the device to any press load range. All that is necessary is to remove the plate 58, withdraw the assembled parts out of the chamber and substitute a different spring and reassemble the parts and replace the plate 58.

I claims:

1. A pressure responsive valve structure comprising: an elongated housing body having a main chamber bore therein open at one end and closed at the other end; a valve chamber at the closed end of the main chamber bore provided by a transverse valve seat having a discharge valve port therethrough; a valve on the seat closing the port at the discharge side thereof; a discharge passage for the port leading from the main chamber bore to the outside of the housing body; a spring adjusting element axially spaced from the valve seat, and having a portion screw threaded in the main chamber bore, and having an unthreaded portion outwardly of the threaded portion axially slidably and rotatably fitting the main chamber bore and sealed therewith by a sealing ring, and having a portion projecting out of the open end of the bore with a handle thereon for turning it; a plunger in the main chamber bore comprising a guide portion axially spaced from the adjusting element and slidably fitting the main chamber bore and reciprocable therein, and comprising a plunger stem outwardly of the guide portion and projecting part way into and slidingly fitting a closed-end bore provided in the adjusting element, and comprising a valve stem axially inwardly of the guide portion abutting upon the valve outwardly of the seat; a compression spring in the main chamber bore surrounding the plunger stem and abutting oppositely on the adjusting element and the guide portion and yieldably holding the valve on the seat by means of the valve stem; a restricted passageway in the plunger opening at one end into the closed-end bore and at the other end extending through the guide portion, and communicating with the discharge side of the seat; means for conducting liquid to the valve chamber at variable pressure comprising a passageway from the valve chamber to the outside of the housing body.

2. A pressure responsive valve structure comprising: an elongated housing body having a main chamber bore therein open at one end and closed at the other end; a valve chamber at the closed end of the main chamber bore provided by a transverse valve seat having a discharge valve port therethrough; a valve on the seat closing the port at the discharge side thereof; a discharge passage for the port leading from the main chamber bore to the outside of the housing body; a spring adjusting element axially spaced from the valve seat; and having a portion screw threaded in the main chamber bore, and having a portion projecting out of the open end of the bore with a handle thereon for turning it; a plunger in the main chamber bore guided for axial reciprocation therein by a portion projecting into a closed end axial bore provided in the adjusting element and by a guide portion adjacent to the valve slidably fitting the main chamber bore, and the plunger having a valve stem portion inwardly of the guide portion abutting upon the valve; a helical compression spring in the main chamber bore closely surrounding the plunger stem, abutting at opposite ends upon the adjusting element and guide portion, respectively, and yieldably holding the valve on the valve seat by means of the valve stem portion; means for conducting liquid to the valve chamber at variable pressure comprising a passageway from the valve chamber to the outside of the housing body; and a restricted passageway in the form of a groove in the side of the plunger, communicating at one end with the closed-end bore and at the other end extending through the guide portion and communicating with the discharge side of the port.

3. A pressure responsive valve structure comprising: an elongated housing body having a main chamber bore therein open at one end and closed at the other end; a valve chamber at the closed end of the main chamber bore provided by a transverse valve seat having a discharge valve port therethrough; a valve on the seat closing the port at the discharge side thereof; a discharge passage for the port leading from the main chamber bore to the outside of the housing body; a spring adjusting element axially spaced from the valve seat, and having a portion screw threaded in the main chamber bore and inwardly thereof having an unthreaded portion slidably fitting the main bore, and having a projecting portion connected to the unthreaded portion projecting out of the open end of the bore with a handle thereon for turning it, to axially positionally adjust the spring adjusting element; a plunger in the main chamber bore; means guiding the plunger for axial reciprocatory movement comprising a guide body on the plunger slidably fitting the main bore, and having a shoulder axially spaced from the spring adjusting element; and the guide body having a portion abutting upon the valve; a compression spring abutting oppositely upon the adjusting element and the guide body shoulder, and yieldably holding the valve on the seat by means of the valve abutting portion; means for conducting liquid to the valve chamber at variable pressure comprising a passageway from the valve chamber to the outside of the housing body, and a stop on the projecting portion engageable with stop means on the housing, to limit adjustment of the spring adjusting element in the spring force increasing direction.

4. In a pressure responsive valve structure, a housing comprising a main body having an elongated generally cylindrical main chamber therein open outwardly at one end and closed at the inner end; a ported valve seat in the main chamber adjacent to the closed end providing a valve chamber at the inner end; a port valve on the outer side of the valve seat; an adjusting element having an inner body telescoped within the main chamber wall adjacent to the outer end, and rotatably and reciprocably slidably fitting the wall, and sealed therewith by sealing means, and having a portion of reduced diameter threaded with the wall inwardly of the inner body, and a portion of the inner body extending out of the open end for manually rotating the inner body to screwingly propel it axially of the chamber; an elongated plunger disposed axially in the main chamber outwardly of the valve seat and comprising a plunger body slidingly fitting the chamber wall, and spaced from the valve seat and providing an exhaust chamber, and comprising a portion of reduced diameter engaging the valve, and comprising an outwardly extending plunger stem of reduced diameter slidable in a closed-end bore provided in the adjusting element; a helical compression spring closely surrounding the reduced diameter portion of the plunger stem and abutting oppositely on the plunger body and adjusting element and yieldably holding the valve on the valve seat in port closing position; an inlet through the chamber wall to the valve chamber; and an outlet through the chamber wall from the exhaust chamber, and a restricted passageway from the closed-end bore to the exhaust chamber in the form of a groove in the side of the plunger, opening at one end into the closed-end bore and at the other end extending through the plunger body and opening into the exhaust chamber.

References Cited in the file of this patent

UNITED STATES PATENTS

| | | |
|---|---|---|
| 1,124,113 | Crook | Jan. 5, 1915 |
| 1,569,187 | Jewell | Jan. 12, 1926 |
| 1,807,564 | Blinn | May 26, 1931 |
| 1,961,758 | Glab | June 5, 1934 |
| 1,999,693 | Hill | Apr. 30, 1935 |
| 2,061,480 | Pigott | Nov. 17, 1936 |
| 2,212,600 | Harm | Aug. 27, 1940 |
| 2,225,880 | Montelius | Dec. 24, 1940 |
| 2,415,258 | Parker et al. | Feb. 4, 1947 |
| 2,440,608 | Hunter | Apr. 27, 1948 |
| 2,470,372 | Roth | May 17, 1949 |
| 2,541,395 | Wilson | Feb. 13, 1951 |